US008420772B2

(12) United States Patent
Cao et al.

(10) Patent No.: US 8,420,772 B2
(45) Date of Patent: Apr. 16, 2013

(54) SEMI-AROMATIC POLYAMIDE AND A METHOD FOR PREPARATION WITH LOW WASTEWATER DISCHARGE

(75) Inventors: Min Cao, Guangzhou (CN); Shiyong Xia, Guangzhou (CN); Xianbo Huang, Guangzhou (CN); Tongmin Cai, Guangzhou (CN); Xiangbin Zeng, Guangzhou (CN)

(73) Assignees: Kingfa Science & Technology Co., Ltd, Guangzhou (CN); Shanghai Kingfa Science & Technology Co., Ltd, Shanghai (CN)

( * ) Notice: Subject to any disclaimer, the term of this patent is extended or adjusted under 35 U.S.C. 154(b) by 295 days.

(21) Appl. No.: 12/743,452

(22) PCT Filed: Jul. 11, 2008

(86) PCT No.: PCT/CN2008/001306
§ 371 (c)(1), (2), (4) Date: May 18, 2010

(87) PCT Pub. No.: WO2010/003277
PCT Pub. Date: Jan. 14, 2010

(65) Prior Publication Data

US 2010/0267923 A1 Oct. 21, 2010

(51) Int. Cl.
*C08G 69/26* (2006.01)

(52) U.S. Cl.
USPC ............................ 528/336; 528/339; 528/347

(58) Field of Classification Search .................. 528/336, 528/339, 347
See application file for complete search history.

(56) References Cited

U.S. PATENT DOCUMENTS

| | | | |
|---|---|---|---|
| 5,496,878 A * | 3/1996 | Goetz et al. | 524/275 |
| 5,674,974 A | 10/1997 | Brearley et al. | |
| 6,846,868 B2 * | 1/2005 | Oka et al. | 524/413 |
| 2003/0050376 A1 | 3/2003 | Oka et al. | |

FOREIGN PATENT DOCUMENTS

| | | |
|---|---|---|
| CN | 1358781 A | 7/2002 |
| CN | 1585796 A | 2/2005 |
| CN | 1590433 A | 3/2005 |
| JP | 2002-114906 A | 4/2002 |
| WO | 2007/085406 A1 | 8/2007 |

* cited by examiner

*Primary Examiner* — Gregory Listvoyb
(74) *Attorney, Agent, or Firm* — Sughrue Mion, PLLC

(57) ABSTRACT

The present invention relates to a semi-aromatic polyamide and a method for preparing it with low wastewater discharge. The semi-aromatic polyamide for the present invention is obtained by introducing aromatic dicarboxylic acid, aliphatic diamine containing 4~14 carbon atoms and the wastewater generated during the previous prepolymerization into an autoclave for prepolymerization reaction and then further polymerizing the prepolymer. In this preparation method, the wastewater generated during polymerization is recycled, thus greatly reducing the wastewater discharge; the raw materials in the wastewater are effectively recycled, thus improving the utilization rate of raw materials; meanwhile, the diamine in the wastewater compensates that lost along with water discharge during prepolymerization, thus ensuring the Mole ratio balance between dicarboxylic acid monomer and diamine monomer.

7 Claims, No Drawings

SEMI-AROMATIC POLYAMIDE AND A METHOD FOR PREPARATION WITH LOW WASTEWATER DISCHARGE

BACKGROUND OF THE INVENTION

1. Technical Field

The present invention relates to the field of polyamide resin technology, more specifically, to a method for preparing semi-aromatic polyamide with low wastewater discharge.

2. Description of Related Art

Aliphatic polyamide, such as PA6 and PA66, boasts excellent mechanical strength, thermal resistance, chemical resistance, abrasion resistance, self-lubrication and low friction coefficient. It has been widely applied in electronic appliances, automobile components, furniture, building materials and fibers, and is one of the most important engineering plastics.

Semi-aromatic polyamide, as one of aromatic polyamides, is a polyamide resin prepared by means of polycondensation of aromatic diamine or dicarboxylic acid with aliphatic diamine or dicarboxylic acid. Since an aromatic ring is introduced into the main chain of polyamide molecules, the thermal resistance and mechanical property are improved, water absorption is reduced and a proper performance price ratio is achieved. It is a kind of resin with high thermal resistance between general engineering plastic nylon and high-heat resistant engineering plastic PEEK, mainly used in automobile and electric & electronic industries. With the rapid development of high technology, its applications achieve new breakthrough and progress and the market demand shows the trend of ascending. Semi-aromatic polyamide products mainly include polyamide MXD6, 6T/66, 6T/61, 6T/6I/66, 6T/M-5T and 9T.

Patent JP57200420, JP58111829, EP1074585A1 and CN1624021A disclose the methods for preparing polyamide MXD6. According to these methods, add aromatic diamine into fused aliphatic dicarboxylic acid by drops, raise the system temperature to remove the water generated due to condensation for polymerization. CN1451677A discloses a method for solid state polymerization of polyamide MXD6, wherein the polyamide is stored in specific conditions, and the yellowness of polyamide MXD6 prepared is very low even it takes 20 days or longer from the completion of preparation of the primary polyamide to solid state polymerization.

Since the melting point of polyamide 6T exceeds the decomposition temperature, a third monomer must be introduced to decrease the melting point. Polyamide 6T copolymer is obtained by means of polycondensation of dicarboxylic acid constituent composed of terephthalic acid and isophthalic acid or adipic acid and diamine constituent mainly composed of 1,6-hexamethylene diamine. The relatively high concentration of amide group in polyamide 6T copolymer may lead to poor chemical resistance, water absorption resistance and stability of melt-processing of polymer. The introduction of a large amount of the third monomer reduces the crystallinity of polymer, and may also lead to the decrease of thermal resistance, chemical resistance, water absorption resistance and dimensional stability.

U.S. Pat. No. 5,516,882, U.S. Pat. No. 5,981,692 and U.S. Pat. No. 962,628 disclose the methods for synthesizing polyamide 6T copolymer through melt-polymerization at the high temperature over 300° C. by using terephthalic acid, isophthalic acid, 1,6-adipic acid, 1,6-hexamethylene diamine and 2-methyl-1,5-pentamethylene diamine as main materials. U.S. Pat. No. 6,140,459 discloses the synthesis of polyamide 6T copolymer through melt-polymerization by using terephthalic acid, 1,6-hexamethylene diamine and another kind of aliphatic long-chain dicarboxylic acid as raw materials. However, when preparing semi-aromatic polyamide by means of melt-polymerization, the later-phase reaction temperature will exceed the melting point of the polymer, various side reactions and degradation reaction of polymer are violent, apt to cause worsened polymer color, lowered mechanical strength and degradation of formability.

U.S. Pat. No. 5,663,284 discloses a method for preparing polyamide 6T/66 polymer through the method below: perform primary polymerization with the presence of water and under the condition that the reaction temperature is lower than the melting point of polymer, maintain the pressure by filling water into the high pressure autoclave when discharging, melt-polymerize the prepolymer by means of the exhaust type double-screw extruder to get high viscosity polymer. However, to get the prepolymer to conform to melt-polymerization requirements, the prepolymerization temperature is close to the melting point of polymer so as to improve the inherent viscosity of prepolymer.

Among the existing technologies, U.S. Pat. No. 6,133,406 puts forward a polymerization technique of semi-aromatic polyamide: with the presence of water, synthesize low inherent viscosity prepolymer at low temperature firstly, then prepare relatively high inherent viscosity polymer through solid state polymerization reaction, finally get a relatively high inherent viscosity polymer through melt-extrusion polymerization with a double-screw extruder. This route involves multiple reactions of prepolymerization, solid state polymerization and melt-extrusion polymerization, requires complicated production procedure and equipment.

In U.S. Pat. No. 6,156,869, after obtaining a prepolymer, a long-period solid state polymerization process can be adopted to get polyamide 9T resin. This technology requires prepolymer with relatively high inherent viscosity. Polyamide 9T features relatively high crystallinity, dimensional stability and relatively low water absorption.

Among the existing technologies, the semi-aromatic polyamide prepolymer with relatively high inherent viscosity can be obtained through raising prepolymerization temperature or discharge the water in prepolymerization reaction system. The heightening of prepolymerization temperature may lead to the occurrence of side reactions, and also the increase of reaction pressure, so the requirements for equipment are also upgraded correspondingly. The diamine without reaction will vaporize with water discharged from reaction system, which results in the great difference between the monomer unit ratio of prepolymer and the initial monomer ratio added into the reactor, thus the Mole ratio balance between dicarboxylic acid monomer and diamine monomer is incapable of being guaranteed.

Diamine loss can be avoided through using a monomer to make salt first, then synthesizing semi-aromatic polyamide by polycondensation of the salt. U.S. Pat. No. 5,663,284 discloses the preparation of semi-aromatic polyamide by using salt through measuring PH value to determine the end point of salt reaction. However, there is a problem in the existing technology: when preparing semi-aromatic polyamide salt by using water or alcohol as a solvent, since the solubility of aromatic dicarboxylic acid and semi-aromatic polyamide salt in these solvents is low, it is difficult to purify semi-aromatic polyamide salt and further get pure semi-aromatic polyamide salt, thus the Mole ratio of dicarboxylic acid and diamine is incapable of being controlled accurately, affecting the quality of the resultant semi-aromatic polyamide; when preparing semi-aromatic polyamide salt by using other organic solvents, high-purity semi-aromatic polyamide salt can be got, but the recycling costs of solvent are heightened.

The method for treating wastewater generated during the synthesis of semi-aromatic polyamide is not involved in the abovementioned patents.

BRIEF SUMMARY OF THE INVENTION

The present invention aims at, through overcoming the problems in the existing technology, providing a method for preparing semi-aromatic polyamide with low wastewater discharge. In this preparation method, the wastewater generated during polymerization is recycled, thus greatly reducing the wastewater discharge; the raw materials in wastewater are effectively recycled, thus improving the utilization rate of raw materials; meanwhile, the diamine in wastewater compensates that lost, along with water discharge during prepolymerization, thus ensuring the Mole ratio balance between dicarboxylic acid monomer and diamine monomer.

Another purpose of the present invention is to provide semi-aromatic polyamide prepared by the abovementioned method.

The abovementioned purpose for the present invention is realized by means of the technical solution below:

A method for preparing semi-aromatic polyamide, comprising the following steps:

(1) Introduce aromatic dicarboxylic acid, aliphatic diamine containing 4~14 carbon atoms and water into an autoclave for prepolymerization reaction;

(2) The semi-aromatic polyamide can be obtained from the resultant prepolymer from Step (1) through solid state polymerization reaction or melt-extrusion polymerization reaction.

The aliphatic diamine containing 4~14 carbon atoms mentioned in Step (1) consists of straight chain aliphatic diamine, branched chain aliphatic diamine or alicyclic diamine, wherein straight chain aliphatic diamine includes 1,4-butanediamine, 1,6-hexamethylene diamine, 1,8-octanediamine, 1,9-nonamethylene diamine, 1,10-decamethylene diamine, 1,11-hendecane diamine or 1,12-dodecane diamine; the branched chain aliphatic diamine includes 2-methyl-1,5-pentamethylene diamine, 3-methyl-1,5-pentamethylene diamine, 2,4-dimethyl-1,6-hexamethylene diamine, 2 ,2,4-trimethyl-1,6-hexamethylene diamine, 2,4,4-trimethyl-1,6-hexamethylene diamine, 2-methyl-1,8-octanediamine or 5-methyl-1,9-nonamethylene diamine; alicyclic diamine includes cyclohexane diamine, methyl cyclohexane diamine or 4,4'-diaminodicyclohexyl methane. The semi-aromatic polyamide can contain one or multiple types of these aliphatic diamines. The aliphatic diamine is preferably 1,6-hexamethylene diamine, 1,9-nonamethylene diamine, 1,10-decamethylene diamine, 2-methyl-1,5-pentamethylene diamine, 2-methyl-1,8-octanediamine or 5-methyl-1,9-nonamethylene diamine. The optimal aliphatic diamine is 1,6-hexamethylene diamine, 1,9-nonamethylene diamine or 1,10-decamethylene diamine.

The aromatic dicarboxylic acid in Step (1) above includes terephthalic acid, isophthalic acid, 2-methylterephthalic acid, 2,5-dichloroterephthalic acid, 2,6-naphthalenedicarboxylic acid, 1,4-naphthalenedicarboxylic acid, 4,4'-biphenyldicarboxylic acid or 2,2'-biphenyldicarboxylic acid. The semi-aromatic polyamide can contain one or multiple types of these aromatic dicarboxylic acids. The aromatic dicarboxylic acid is preferably terephthalic acid, isophthalic acid or 4,4'-biphenyldicarboxylic acid. The aromatic dicarboxylic acid is terephthalic acid most preferably.

The water in Step (1) above may also be the wastewater generated during the previous prepolymerization. Aliphatic diamine with 4~14 carbon atoms (0.1-5 wt %) is contained in the wastewater.

The prepolymerization in Step (1) above is to introduce aromatic dicarboxylic acid, aliphatic diamine containing 4~14 carbon atoms, water, end-capping agent, catalyst into high pressure autoclave for reaction at the temperature of 200~280° C., under the reaction system pressure of 1~5MPa for 1~6 hours, and then to keep stable pressure through discharging the water in systems in the latter reaction stage, dry the prepolymer for future use after finishing the reaction, and gather the wastewater discharged from the system in the latter reaction stage and the wastewater separated when drying prepolymer after finishing reaction for use in the next polymerization, wherein the reaction temperature is preferably 220~250° C. ; the reaction time is preferably 2~4 houses; the reaction system pressure is preferably 1.5~3 Mpa. Through the prepolymerization reaction, it can be obtained that the inherent viscosity [η] in 96% sulphuric acid at the temperature of 25° C. is measured to be 0.06~0.3 dl/g, the prepolymer within 0.08~0.2 dl/g is preferable.

The catalyst includes phosphoric acid, phosphorous acid, hypophosphorous acid or its salt or its ester, preferably sodium phosphate, sodium phosphate, sodium hypophosphite and potassium phosphate. The amount of the catalyst is 0.01~2 wt % of the raw materials (raw materials indicate the total weight of aromatic dicarboxylic acid, aliphatic diamine containing 4~14 carbon atoms, end-capping agent and catalyst), 0.05~1 wt % preferably.

The end-capping agent includes monocarboxylic acid or monoamine or their mixture, wherein monocarboxylic acid is preferable since the monocarboxylic acid, relative to monoamine, is with lower toxicity, unapt to volatilize and easy to be treated; monocarboxylic acid includes aliphatic monocarboxylic acids such as acetic acid, propanoic acid, butyric acid, valeric acid, caproic acid, pivalic acid, isobutyric acid, enanthic acid, caprylic acid, nonanoic acid, lauric acid and stearic acid; alicyclic monocarboxylic acids such as cyclopropane-carboxylic acid, cyclopentane acetic acid and cyclohexanecarboxylic acid; aromatic monocarboxylic acids such as benzoic acid, p-toluic acid, o-toluic acid, 4-tert-Butylbenzonic acid, salicylic acid, p-methoxybenzoic acid, phenylacetic acid and cinnamic acid. The end-capping agent can be one or several of them, wherein the monocarboxylic acid is acetic acid, propanoic acid, butyric acid, lauric acid, stearic acid, benzoic acid or phenylacetic acid most preferably. The monoamine includes aliphatic monoamine such as ethylamine, n-propylamine, isopropylamine, n-butylamine, sec-butylamine, isobutylamine, n-amylamine, n-decylamine, dodecylamine and stearylamine; alicyclic monoamine such as cyclohexylamine; aromatic monoamine such as aniline, p-toluidine, o-toluidine, 2,6-dimethylaniline, 3,4-dimethylaniline and o-ethylaniline. The end-capping agent can be one or several of them. The monoamine is ethylamine, n-propylamine, n-butylamine, aniline or p-toluidine optimally. The mole weight of the end-capping agent is 0.2~10% of aromatic dicarboxylic acid, 0.5~5% preferably, since the molecular weight of polymer may become overly low when the amount of the end-capping agent is too high; the molecular weight of the polymer may become overly high or the active end group content of the polymer is overly high when the amount of end-capping agent is too low.

In Step (1) above, the water added during the early prepolymerization stage is 15~35 wt %, since materials may be cured during polymerization with overly low water amount, reaction is impossible to be performed and the resultant materials are incapable of being discharged from reactor; the speed of polymerization reaction may be lowered with overly high water amount, the inherent viscosity of prepolymer obtained may be also decreased, and solid state polymerization reaction is impossible to be carried out smoothly, while a large amount of water is discharged during polymerization in order to improve reaction speed and the inherent viscosity of prepolymer, leading to serious loss of diamine and damage of Mole ratio of monomer inevitably.

In Step (1) above, the water added will not be involved with in prepolymerization reaction, moreover, prepolymerization reaction can produce a small amount of water. After prepolymerization finishes, wastewater slightly higher than the water required for introduction can be gathered, while the wastewater can be further added during the next prepolymerization reaction. With such recirculation, prepolymerization does not need to use fresh water, and almost no wastewater discharge is required, since the wastewater generated during prepolymerization contains a small amount of diamine, the discharge of the wastewater may lead to the loss of diamine, while the wastewater recycling also indicates the increase of utilization rate of raw material diamine. Meanwhile, the diamine contained in wastewater in early prepolymerization stage compensates for the diamine lost along with the water discharge during prepolymerization, thus guaranteeing the Mole ratio balance between dicarboxylic acid monomer and diamine monomer, facilitating the smooth progress of polymerization reaction and getting the semi-aromatic polyamide with high inherent viscosity.

In Step (2) above, the prepolymer can be polymerization through solid state polymerization reaction and melt-extrusion polymerization reaction, wherein solid state polymerization method is preferable. Solid state polymerization reaction is performed below the melting point of polymer, preferably at 220~280° C., and the solid state polymerization reaction time is 3~20 hours, preferably 5~15 hours; to prevent the polymer from oxidation, solid state polymerization reaction is carried out under nitrogen atmosphere or vacuum condition, preferably under a nitrogen atmosphere. The advantages of solid state polymerization include low reaction temperature, few degradation reaction and high-quality resultant polyamide with favorable color, dimensional stability and thermal resistance. Melt-extrusion polymerization is performed on extrusion equipment with vents; the melt-extrusion temperature is higher than the melting point of polymer, preferably at 290~350° C.; the melt-extrusion polymerization reaction time is 1~8 minutes, preferably 2~6 minutes. The advantages of melt-extrusion polymerization include relatively short reaction time. With a polymerization reaction, the resultant semi-aromatic polyamide may be obtained.

With regard to the semi-aromatic polyamide obtained by the present invention, the inherent viscosity [η] 0.8~2.5 dl/g, preferably 1.0~2.0 dl/g; carboxyl end group content is 15~80 mol/t, preferably 15~50 mol/t; amino end group content is 15~80 mol/t, preferably 15~60 mol/t; the melting point is 270~330° C., preferably 290~330° C. The reason for the preference is that the thermal resistance of the polyamide may fail to meet the requirements of the present invention when the melting point is overly low; while degradation reaction may occur during hot processing when the melting point is overly high.

Compared with the existing technology, the present invention is provided with the following favorable effects: 1. in the method for preparing semi-aromatic polyamide for the present invention, the wastewater generated during polymerization is recycled, thus greatly reducing the discharge of wastewater; the raw materials in the wastewater are effectively recycled, in this way improving the utilization rate of raw material diamine; meanwhile, the diamine contained in water in early prepolymerization stage compensates that lost along with water discharge during prepolymerization, thus ensuring the Mole ratio balance between dicarboxylic acid monomer and diamine monomer. 2. The semi-aromatic polyamide prepared in the present invention boasts relatively high crystallinity, inherent viscosity and heat-resistance temperature, fine color, low active end group content, high processing stability, and no corrosion to dies. As demanded, antioxidant, lubricant, nucleating agent, fire retardant, colorant, plasticizer and antistatic agent can be added; fiberglass, carbon fiber and inorganic filler can be also added for reinforcement; and other polymer can be mixed to prepare polymer alloy.

DETAILED DESCRIPTION OF THE INVENTION

The present invention is detailed by the embodiments that will not limit the invention. The characteristics of the embodiments and comparative illustrations are all determined according to the methods below.

1. Inherent Viscosity [η]

Measure the logarithmic viscosity number $\eta_{inh}$ of polyamide with concentration of 0.05, 0.1, 0.3 and 1 g/dl in dense sulphuric acid at 25° C.

$$\eta_{inh}=[ln(t_1/t_0)]/C$$

Wherein: $\eta_{inh}$ indicates logarithmic viscosity number (dl/g), $t_0$ indicates the flow time of solvent (sec), $t_1$ indicates the flow time of solution sample (sec), C indicates the concentration of solution sample (g/dl).

$\eta_{inh}$ data is extrapolated to the concentration of 0 so as to get the inherent viscosity [η] of the sample.

2. Amino End Group Content

Titrate amino end group content sample with an automatic potentiometric titrator. Take 0.5 g of polymer, add 45 ml of phenol and 3 ml of absolute methanol, heat and back-flow the mixture, cool to room temperature after the sample is fully dissolved, and then titrate amino end group content by using calibrated hydrochloric acid standard solution.

3. Carboxyl End Group Content

Titrate carboxyl end group content sample with an automatic potentiometric titrator. Take 0.5 g of polymer, add 50 ml of o-cresol, back-flow and dissolve the mixture, cool down and then introduce 400 μL of formaldehyde solution immediately, and then titrate carboxyl end group content by using calibrated KOH-ethanol solution.

4. Diamine Content in Wastewater

Titrate diamine content in the wastewater generated during prepolymerization with an automatic potentiometric titrator. Take 100 ml of wastewater and then titrate diamine content by using calibrated hydrochloric acid standard solution.

5. Melting Point and Fusion Heat

Test the melting point and fusion heat of the sample with a Perkin Elmer DSC-6 analylizer under nitrogen atmosphere at the flow rate of 40 mL/min. Raise the sample temperature to 340° C. at the speed of 10° C./min and keep 2 min at the temperature of 340□ first, and then cool the sample to 50° C. at the speed of 10° C./min, afterwards, raise the temperature to 340° C. at the speed of 10° C. /min, set the endothermic peak temperature at melting point Tm at this time, and calculate the fusion heat ΔHm by means of the endothermic peak area at this time.

6. Crystallinity

Measure the crystallinity of polymer by X-ray diffraction method. Prepare amorphous sample by using fused polymer through liquid nitrogen quenching. The X-ray diffraction peak areas of amorphous sample and polymer sample are $S_1$ and $S_2$ respectively. Afterwards, the crystallinity is calculated by means of the formula below:

$$X_c=(S_2-S_1)/S_2\times100$$

Wherein: $X_c$ indicates crystallinity (%), $S_1$ indicates the X-ray diffraction peak area of amorphous sample, $S_2$ indicates the X-ray diffraction peak area of polymer sample.

Comparative Illustration 1

Add 3323 g (20 mol) of terephthalic acid, 3446 g (20 mol) of 1,10-decamethylene diamine, 73.27 g (0.6 mol) of benzoic acid, 6.85 g of (0.1 wt % based on total weight of raw materials) sodium hypophosphite and 2283 g of (25 wt % based on total weight of reaction system) deionized water into the 20 L autoclave equipped with a magnetic coupling stirrer, condenser tube, gas port, charging hole and pressure & explosion-proof opening, and then raise the temperature after nitrogen purging. Raise the temperature to 220° C. within 2 hours by stirring, stir the reaction mixture for 1 hour at 220° C., and then raise the temperature of the reactant to 230° C. while stirring. Continue the reaction for 2 hours at a constant temperature of 230° C. and under a constant pressure of 2 Mpa, keep the constant pressure while removing the water formed, discharge the resultant materials after reaction, dry the prepolymer for 24 hours at 80° C. under vacuum condition, in this way, to get the prepolymer with inherent viscosity [η] being 0.14 dl/g. A total of 2361 g of wastewater is gathered during prepolymerization, wherein the diamine content in the wastewater is 1.7 wt %. PA10T resin can be acquired through solid-state polymerizing the prepolymer under a nitrogen atmosphere at 260° C. for 10 hours, wherein the melting point is 319° C., fusion heat is 67.5 J/g, inherent viscosity [η] is 1.02 dl/g, amino end group content is 14 mol/t and carboxyl end group content is 107 mol/t. The results are shown in Table 1.

Embodiment 1

Add 3323 g (20 mol) of terephthalic acid, 3446 g (20 mol) of 1,10-decamethylene diamine, 73.27 g (0.6 mol) of benzoic acid, 6.85 g of (0.1 wt % based on total weight of raw materials) sodium hypophosphite and 2283 g of (25 wt % based on total weight of reaction system) wastewater in Comparative illustration 1 into the 20 L autoclave equipped with a magnetic coupling stirrer, condenser tube, gas port, charging hole and pressure & explosion-proof opening, and then raise the temperature after nitrogen purging. Raise the temperature to 220° C. within 2 hours while stirring, stir the reaction mixture for 1 hour at 220° C., and then raise the temperature of the reactant to 230° C. while stirring. Continue the remaining reaction for 2 hours at the constant temperature of 230° C. and under the constant pressure of 2 Mpa, keep constant pressure through removing the water formed, discharge the resultant materials after reaction, dry the prepolymer for 24 hours at 80° C. under vacuum condition, in this way, to get the prepolymer with inherent viscosity [η] being 0.15 dl/g. A total of 2339 g of wastewater is gathered during prepolymerization, wherein the diamine content in the wastewater is 1.8 wt %. PA10T resin can be acquired through solid-state polymerizing the prepolymer under nitrogen atmosphere at 260° C. for 10 hours, wherein the melting point is 320° C., fusion heat is 73.5 J/g, inherent viscosity [η] is 1.38 dl/g, amino end group content is 35 mol/t and carboxyl end group content is 43 mol/t. The results are shown in Table 1.

Embodiment 2

Repeat the preparation steps in Embodiment 1. The difference is that the wastewater introduced is gathered during polymerization in Embodiment 1. The results are shown in Table 1.

Embodiment 3

Repeat the preparation steps in Embodiment 1. The difference is that the wastewater introduced is gathered during polymerization in Embodiment 2. The results are shown in Table 1.

Embodiment 4

Repeat the preparation steps in Embodiment 1. The difference is that the wastewater introduced is gathered during polymerization in Embodiment 3. The results are shown in Table 1.

TABLE 1

| | Comparative illustration 1 | Embodiment 1 | Embodiment 2 | Embodiment 3 | Embodiment 4 |
|---|---|---|---|---|---|
| Terephthalic acid (mol) | 20 | 20 | 20 | 20 | 20 |
| 1,10-Decamethylene diamine (mol) | 20 | 20 | 20 | 20 | 20 |
| Amount of deionized water added (g) | 2283 | | | | |
| Amount of wastewater added (g) | | 2283 | 2283 | 2283 | 2283 |
| Amount of wastewater gathered (g) | 2361 | 2339 | 2415 | 2396 | 2357 |
| Diamine content in wastewater (wt %) | 1.7 | 1.8 | 1.6 | 1.9 | 1.7 |
| Prepolymer inherent viscosity [η] (dl/g) | 0.14 | 0.15 | 0.14 | 0.15 | 0.16 |
| Polyamide inherent viscosity [η] (dl/g) | 1.02 | 1.38 | 1.41 | 1.45 | 1.34 |
| Amino end group content (mol/t) | 14 | 35 | 37 | 41 | 39 |
| Carboxyl end group content (mol/t) | 107 | 43 | 41 | 38 | 50 |
| Melting point (° C.) | 319 | 320 | 320 | 321 | 320 |
| Δ Hm (J/g) | 67.5 | 73.5 | 69.6 | 71.4 | 75.2 |
| Crystallinity (%) | 23 | 26 | 25 | 27 | 24 |

Comparative Illustration 2

Add 2824 g (17 mol) of terephthalic acid, 498 g (3 mol) of isophthalic acid, 3446 g (20 mol) of 1,10-decamethylene diamine, 73.27 g (0.6 mol) of benzoic acid, 6.85 g of (0.1 wt % based on total weight of raw materials) sodium hypophosphite and 2283 g of (25 wt % based on total weight of reaction system) deionized water into the 20 L autoclave equipped with magnetic coupling stirrer, condenser tube, gas port, charging hole and pressure & explosion-proof opening, and then raise the temperature after nitrogen purging. Raise the temperature to 220° C. within 2 hours in while stirring, stir the reaction mixture for 1 hour at 220° C., and then raise the temperature of the reactant to 230° C. while stirring. Continue the remaining reaction for 2 hours at the constant temperature of 230° C. and under the constant pressure of 2Mpa, keep a constant pressure through removing the water formed, discharge the resultant materials after reaction, dry the prepolymer for 24 hours at 80° C. under vacuum condition, in this way, to get the prepolymer with inherent viscosity [η] being 0.13 dl/g. A total of 2356 g of wastewater is gathered during prepolymerization, wherein the diamine content in the wastewater is 1.5 wt %. Semi-aromatic polyamide resin can be acquired through solid-state polymerizing the prepolymer under nitrogen atmosphere at 260° C. for 10 hours, wherein the melting point is 291° C., fusion heat is 38.7 J/g, inherent viscosity [η] is 0.97 dl/g, amino end group content is 19 mol/t and carboxyl end group content is 112 mol/t. The results are shown in Table 2.

Embodiment 5

Add 2824 g (17 mol) of terephthalic acid, 498 g (3 mol) of isophthalic acid, 3446 g (20 mol) of 1,10-decamethylene diamine, 73.27 g (0.6 mol) of benzoic acid, 6.85 g of (0.1 wt % based on total weight of raw materials) sodium hypophosphite and 2283 g of (25 wt % based on total weight of reaction system) wastewater in Comparative illustration 2 into the 20 L autoclave equipped with a magnetic coupling stirrer, condenser tube, gas port, charging hole and pressure & explosion-proof opening, and then raise the temperature after nitrogen purging. Raise the temperature to 220° C. within 2 hours while stirring, stir the reaction mixture for 1 hour at 220° C., and then raise the temperature of the reactant to 230° C. while stirring. Continue the remaining reaction for 2 hours at the constant temperature of 230° C. and under the constant pressure of 2 Mpa, keep constant pressure through removing the water formed, discharge the resultant materials after reaction, dry the prepolymer for 24 hours at 80° C. under vacuum condition, in this way, to get the prepolymer with inherent viscosity [η] being 0.15 dl/g. A total of 2386 g of wastewater is gathered during prepolymerization, wherein the diamine content in the wastewater is 1.8 wt %. Semi-aromatic polyamide resin can be got through solid-state polymerizing the prepolymer under nitrogen atmosphere at 260 ° C. for 10 hours, wherein the melting point is 292° C., fusion heat is 45.3 J/g, inherent viscosity [η] is 1.27 dl/g, amino end group content is 43 mol/t and carboxyl end group content is 51 mol/t. The results are shown in Table 2.

Embodiment 6

Repeat the preparation steps in Embodiment 5. The difference is that the wastewater introduced is gathered during polymerization in Embodiment 5. The results are shown in Table 2.

Embodiment 7

Repeat the preparation steps in Embodiment 5. The difference is that the wastewater introduced is gathered during polymerization in Embodiment 6. The results are shown in Table 2.

Embodiment 8

Repeat the preparation steps in Embodiment 5. The difference is that the wastewater introduced is gathered during polymerization in Embodiment 7. The results are shown in Table 2.

TABLE 2

| | Comparative illustration 2 | Embodiment 5 | Embodiment 6 | Embodiment 7 | Embodiment 8 |
|---|---|---|---|---|---|
| Terephthalic acid (mol) | 17 | 17 | 17 | 17 | 17 |
| Isophthalic acid (mol) | 3 | 3 | 3 | 3 | 3 |
| 1,10-decamethylene diamine (mol) | 20 | 20 | 20 | 20 | 20 |
| Amount of deionized water added (g) | 2283 | | | | |
| Amount of wastewater added (g) | | 2283 | 2283 | 2283 | 2283 |
| Amount of wastewater gathered (g) | 2356 | 2386 | 2325 | 2334 | 2406 |
| Diamine content in wastewater (wt %) | 1.5 | 1.8 | 1.8 | 1.9 | 1.7 |
| Prepolymer inherent viscosity [η] (dl/g) | 0.13 | 0.15 | 0.14 | 0.13 | 0.16 |
| Polyamide inherent viscosity [η] (dl/g) | 0.97 | 1.27 | 1.36 | 1.32 | 1.43 |
| Amino end group content (mol/t) | 19 | 43 | 36 | 35 | 44 |
| Carboxyl end group content (mol/t) | 112 | 51 | 47 | 39 | 54 |
| Melting point (° C.) | 291 | 292 | 292 | 291 | 292 |
| Δ Hm (J/g) | 38.7 | 45.3 | 39.6 | 42.9 | 47.2 |
| Crystallinity (%) | 11 | 14 | 15 | 13 | 16 |

Comparative Illustration 3

Add 3323 g (20 mol) of terephthalic acid, 2929 g (17 mol) of 1,10-decamethylene diamine, 517 g (3 mol) of 5-methyl-1,9-nonamethylene diamine, 73.27 g (0.6 mol) of benzoic acid, 6.85 g of (0.1 wt % based on total weight of raw materials) sodium hypophosphite and 2283 g of (25 wt % based on total weight of reaction system) deionized water into the 20 L autoclave equipped with magnetic coupling stirrer, condenser tube, gas port, charging hole and pressure & explosion-proof opening, and then raise the temperature after nitrogen purging. Raise the temperature to 220° C. within 2 hours while stirring, stir the reaction mixture for 1 hour at 220° C., and then raise the temperature of the reactant to 230° C. while stirring. Continue remaining reaction for 2 hours at the constant temperature of 230° C. and under the constant pressure of 2 Mpa, keep constant pressure through removing the water formed, discharge the resultant materials after reaction, dry the prepolymer for 24 hours at 80° C. under vacuum condition, in this way, to get the prepolymer with inherent viscosity [η] being 0.13 dl/g. A total of 2317 g of wastewater is gathered during prepolymerization, wherein the diamine content in the wastewater is 1.6 wt %. Semi-aromatic polyamide resin can be got through solid-state polymerizing the prepolymer under nitrogen atmosphere at 260° C. for 10 hours, wherein the melting point is 294° C., fusion heat is 41.2 J/g, inherent viscosity [η] is 1.07 dl/g, amino end group content is 16 mol/t and carboxyl end group content is 96 mol/t. The results are shown in Table 3.

Embodiment 9

Add 3323 g (20 mol) terephthalic acid, 2929 g (17 mol) of 1,10-decamethylene diamine, 517 g (3 mol) of 5-methyl-1,9-nonamethylene diamine, 73.27 g (0.6 mol) of benzoic acid, 6.85 g of (0.1 wt % based on total weight of raw materials) sodium hypophosphite and 2283 g of (25 wt % based on total weight of reaction system) wastewater in Comparative illustration 3 into the 20 L autoclave equipped with magnetic coupling stirrer, condenser tube, gas port, charging hole and pressure & explosion-proof opening, and then raise the temperature after nitrogen purging. Raise the temperature to 220° C. within 2 hours while stirring, stir the reaction mixture for 1 hour at 220° C., and then raise the temperature of the reactant to 230° C. in stirring state. Continue remaining reaction for 2 hours at the constant temperature of 230° C. and under the constant pressure of 2 Mpa, keep constant pressure through removing the water formed, discharge the resultant materials after reaction, dry the prepolymer for 24 hours at 80° C. under vacuum condition, in this way, to get the prepolymer with inherent viscosity [η] being 0.15 dl/g. A total of 2395 g of wastewater is gathered during prepolymerization, wherein the diamine content in the wastewater is 1.7 wt %. Semi-aromatic polyamide resin can be acquired through solid-state polymerizing the prepolymer under a nitrogen atmosphere at 260° C. for 10 hours, wherein the melting point is 294° C., fusion heat is 48.3 J/g, inherent viscosity [η] is 1.29 dl/g, amino end group content is 34 mol/t and carboxyl end group content is 50 mol/t. The results are shown in Table 3.

Comparative Illustration 4

Add 1994 g (12 mol) of terephthalic acid, 1329 g (8 mol) of isophthalic acid, 2324 g (20 mol) of 1,6-hexamethylene diamine, 73.27 g (0.6 mol) of benzoic acid, 5.73 g of (0.1 wt % based on total weight of raw materials) sodium hypophosphite and 1909 g of (25 wt % based on total weight of reaction system) deionized water into the 20 L autoclave equipped with magnetic coupling stirrer, condenser tube, gas port, charging hole and pressure & explosion-proof opening, and then raise the temperature after nitrogen purging. Raise the temperature to 220° C. within 2 hours while stirring, stir the reaction mixture for 1 hour at 220° C., and then raise the temperature of the reactant to 230° C. while stirring. Continue remaining reaction for 2 hours at the constant temperature of 230° C. and under the constant pressure of 2 Mpa, keep constant pressure through removing the water formed, discharge the resultant materials after reaction, dry the prepolymer for 24 hours at 80° C. under vacuum condition, in this way, to get the prepolymer with inherent viscosity [η] being 0.14 dl/g. A total of 1960 g of wastewater is gathered during prepolymerization, wherein the diamine content in the wastewater is 1.4 wt %. Semi-aromatic polyamide resin can be acquired through solid-state polymerizing the prepolymer under nitrogen atmosphere at 260° C. for 10 hours, wherein the melting point is 312° C., fusion heat is 34.8 J/g, inherent viscosity [η] is 0.96 dl/g, amino end group content is 17 mol/t and carboxyl end group content is 92 mol/t. The results are shown in Table 3.

Embodiment 10

Add 1994 g (12 mol) of terephthalic acid, 1329 g (8 mol) of isophthalic acid, 2324 g (20 mol) of 1,6-hexamethylene diamine, 73.27 g (0.6 mol) of benzoic acid, 5.73 g of (0.1 wt % based on total weight of raw materials) sodium hypophosphite and 1909 g of (25 wt % based on total weight of reaction system) wastewater in Comparative illustration 4 into the 20 L autoclave equipped with magnetic coupling stirrer, condenser tube, gas port, charging hole and pressure & explosion-proof opening, and then raise the temperature after nitrogen purging. Raise the temperature to 220° C. within 2 hours while stirring, stir the reaction mixture for 1 hour at 220° C., and then raise the temperature of the reactant to 230° C. while stirring. Continue remaining reaction for 2 hours at the constant temperature of 230° C. and under the constant pressure of 2 Mpa, keep constant pressure through removing the water formed, discharge the resultant materials after reaction, dry the prepolymer for 24 hours at 80° C. under vacuum condition, in this way, to obtain the prepolymer with inherent viscosity [η] being 0.15 dl/g. A total of 2053 g of wastewater is gathered during prepolymerization, wherein the diamine content in the wastewater is 1.4 wt %. Semi-aromatic polyamide resin can be got through solid-state polymerizing the prepolymer under nitrogen atmosphere at 260° C. for 10 hours, wherein the melting point is 312° C., fusion heat is 33.4 J/g, inherent viscosity [η] is 1.32 dl/g, amino end group content is 33 mol/t and carboxyl end group content is 39 mol/t. The results are shown in Table 3.

Comparative Illustration 5

Add 3323 g (20 mol) of terephthalic acid, 1394 g (12 mol) of 1,6-hexamethylene diamine, 930 g (8 mol) of 2-methyl-1,5-pentamethylene diamine, 73.27 g (0.6 mol) of benzoic acid, 5.73 g of (0.1 wt % based on total weight of raw materials) sodium hypophosphite and 1909 g of (25 wt % based on total weight of reaction system) deionized water into the 20 L autoclave equipped with magnetic coupling stirrer, condenser tube, gas port, charging hole and pressure & explosion-proof opening, and then raise the temperature after nitrogen purging. Raise the temperature to 220° C. within 2 hours while stirring, stir the reaction mixture for 1 hour at 220° C., and then raise the temperature of the reactant to 230 ° C. while stirring. Continue remaining reaction for 2 hours at the constant temperature of 230° C. and under the constant pressure of 2 Mpa, keep constant pressure through removing the water formed, discharge the resultant materials after reaction, dry the prepolymer for 24 hours at 80° C. under vacuum condition, in this way, to obtain the prepolymer with inherent viscosity [η] being 0.15 dl/g. A total of 2023 g of wastewater is gathered during prepolymerization, wherein the diamine content in the wastewater is 1.3 wt %. Semi-aromatic polyamide resin can be got through solid-state polymerizing the prepolymer under nitrogen atmosphere at 260° C. for 10 hours, wherein the melting point is 316° C., fusion heat is 34.2 J/g, inherent viscosity [η] is 1.11 dl/g, amino end group content is 19 mol/t and carboxyl end group content is 87 mol/t. The results are shown in Table 3.

Embodiment 11

Add 3323 g (20 mol) of terephthalic acid, 1394 g (12 mol) of 1,6-hexamethylene diamine, 930 g (8 mol) of 2-methyl-1,5-pentamethylene diamine, 73.27 g (0.6 mol) of benzoic acid, 5.73 g of (0.1 wt % based on total weight of raw materials) sodium hypophosphite and 1909 g of (25 wt % based on total weight of reaction system) wastewater in Comparative illustration 5 into the 20 L autoclave equipped with magnetic coupling stirrer, condenser tube, gas port, charging hole and pressure & explosion-proof opening, and then raise the temperature after nitrogen purging. Raise the temperature to 220° C. within 2 hours while stirring, stir the reaction mixture for 1 hour at 220° C., and then raise the temperature of the reactant to 230° C. while stirring. Continue remaining reaction for 2 hours at the constant temperature of 230° C. and under the constant pressure of 2Mpa, keep constant pressure through removing the water formed, discharge the resultant materials after reaction, dry the prepolymer for 24 hours at 80° C. under vacuum condition, in this way, to acquire the prepolymer with inherent viscosity [η] being 0.15 dl/g. A total of 1987 g of wastewater is gathered during prepolymerization, wherein the diamine content in the wastewater is 1.5 wt %. Semi-aromatic polyamide resin can be obtained through solid-state polymerizing the prepolymer under a nitrogen atmosphere at 260° C. for 10 hours, wherein the melting point is 317° C., fusion heat is 35.7 J/g, inherent viscosity [η] is 1.43 dl/g, amino end group content is 40 mol/t and carboxyl end group content is 49 mol/t. The results are shown in Table 3.

TABLE 3

| | Comparative illustration 3 | Embodiment 9 | Comparative illustration 4 | Embodiment 10 | Comparative illustration 5 | Embodiment 11 |
|---|---|---|---|---|---|---|
| Terephthalic acid (mol) | 20 | 20 | 12 | 12 | 20 | 20 |
| Isophthalic acid (mol) | | | 8 | 8 | | |
| 1,10-Decamethylene diamine (mol) | 17 | 17 | | | | |
| 5-Methyl-1,9-nonamethylene diamine (mol) | 3 | 3 | | | | |
| 1,6-Hexamethylene diamine (mol) | | | 20 | 20 | 12 | 12 |
| 2-Methyl-1,5-pentamethylene diamine (mol) | | | | | 8 | 8 |
| Amount of deionized water added (g) | 2283 | | 1909 | | 1909 | |
| Amount of wastewater added (g) | | 2283 | | 1909 | | 1909 |
| Amount of wastewater gathered (g) | 2317 | 2395 | 1960 | 2053 | 2023 | 1987 |
| Diamine content in wastewater (wt %) | 1.6 | 1.7 | 1.4 | 1.4 | 1.3 | 1.5 |
| Prepolymer inherent viscosity [η] (dl/g) | 0.13 | 0.15 | 0.14 | 0.15 | 0.15 | 0.15 |
| Polyamide inherent viscosity [η] (dl/g) | 1.07 | 1.29 | 0.96 | 1.32 | 1.11 | 1.43 |
| Amino end group content (mol/t) | 16 | 34 | 17 | 33 | 19 | 40 |
| Carboxyl end group content (mol/t) | 96 | 50 | 92 | 39 | 87 | 49 |
| Melting point (° C.) | 294 | 294 | 312 | 312 | 316 | 317 |
| Δ Hm (J/g) | 41.2 | 48.3 | 34.8 | 33.4 | 34.2 | 35.7 |
| Crystallinity (%) | 12 | 14 | 10 | 9 | 8 | 11 |

What is claimed is:

1. A method for preparing semi-aromatic polyamide with low wastewater discharge, comprising (1) introducing aromatic dicarboxylic acid, aliphatic diamine containing 4~14 carbon atoms and water into an autoclave for prepolymerization reaction; the water is the wastewater generated during the previous prepolymerization and the wastewater contains 0.1~5 wt % of aliphatic diamine with 4~14 carbon atoms;

(2) obtaining the semi-aromatic polyamide from the resultant prepolymer from Step (1) through solid-state polymerization reaction or melt-extrusion polymerization reaction.

2. The preparation method according to claim 1, wherein the aliphatic diamine in Step (1) is one or a mixture of several of straight chain aliphatic diamine, branched chain aliphatic diamine or alicyclic diamine.

3. The preparation method according to claim 2, wherein the straight chain aliphatic diamine is 1,4-butanediamine, 1,6-hexamethylene diamine, 1,8-octanediamine, 1,9-nonamethylene diamine, 1,10-decamethylene diamine, 1,11-hendecane diamine or 1,12-dodecane diamine; the branched chain aliphatic diamine is 2-methyl-1,5-pentamethylene diamine, 3-methyl-1,5-pentamethylene diamine, 2,4-dimethyl-1,6-hexamethylene diamine, 2,2,4-trimethyl-1,6-hexamethylene diamine, 2,4,4-trimethyl-1,6-hexamethylene diamine, 2-methyl-1,8-octanediamine or 5-methyl-1,9-nonamethylene diamine; the alicyclic diamine is cyclohexane diamine, methyl cyclohexane diamine or 4,4'-diaminodicyclohexyl methane.

4. The preparation method according to claim 1, wherein the aromatic dicarboxylic acid is terephthalic acid, isophthalic acid, 2-methylterephthalic acid, 2,5-dichloroterephthalic acid, 2,6-naphthalenedicarboxylic acid, 1,4-naphthalenedicarboxylic acid, 4,4'-biphenyldicarboxylic acid or 2,2'-biphenyldicarboxylic acid.

5. The preparation method according to claim 1, wherein the prepolymerization reaction in Step (1) is to introduce aromatic dicarboxylic acid, aliphatic diamine containing 4~14 carbon atoms, water, end-capping agent, catalyst into high pressure autoclave for reaction at the temperature of 200~280° C., under the reaction system pressure of 1~5 MPa for 1~6 hours, and then to keep a stable pressure through discharging the water in systems in the latter reaction stage, dry the prepolymer for future use after finishing reaction; the amount of water added is 15 ~35 wt % of the whole reaction system, the catalyst amount is 0.01~2 wt % of raw materials, the molal weight of the end-capping agent is 0.2~10% of the aromatic dicarboxylic acid; the catalyst is phosphoric acid, phosphorous acid, hypophosphorous acid or its salt or its ester; the end-capping agent is monocarboxylic acid or monoamine or their mixture.

6. The preparation method according to claim 5, wherein the catalyst is sodium phosphate, sodium phosphate, sodium hypophosphite, potassium phosphate; the monocarboxylic acid is acetic acid, propanoic acid, butyric acid, lauric acid, stearic acid, benzoic acid or phenylacetic acid; the monoamine is ethylamine, n-propylamine, n-butylamine, aniline or p-toluidine.

7. The preparation method according to claim 1, wherein the solid-state polymerization reaction in Step (2) is carried out under nitrogen atmosphere or vacuum condition, wherein the reaction temperature is 220~280° C., the reaction time is 3~20 hours; the melt-extrusion polymerization reaction is performed on extrusion equipment with vents; wherein the reaction temperature is 290~350° C., the reaction time is 1~8 minutes.

* * * * *